United States Patent [19]
Van Lanen, deceased et al.

[11] 3,868,307
[45] Feb. 25, 1975

[54] PRODUCTION OF DISTILLERS YEAST

[75] Inventors: James M. Van Lanen, deceased, late of Peoria, Ill.; Merritt B. Smith; Weldon F. Maisch, both of Peoria, Ill.

[73] Assignee: Hiram Walker & Sons, Inc., Peoria, Ill.

[22] Filed: Aug. 15, 1973

[21] Appl. No.: 388,359

Related U.S. Application Data

[63] Continuation-in-part of Ser. No. 189,678, Oct. 15, 1971, abandoned.

[52] U.S. Cl. .................. 195/82, 195/31 R, 195/74, 426/14, 426/28
[51] Int. Cl. ............................................. C12c 11/00
[58] Field of Search .................. 426/62, 28, 29, 14; 195/31 R, 74, 82

[56] References Cited
UNITED STATES PATENTS
2,790,718   4/1957   Nugey .................................. 426/29
3,418,211   12/1968   Van Lanen et al. .............. 195/31 R OTHER PUBLICATIONS
Underkofler et al., Saccharification of Grain Mashes for Alcoholic Fermentation, Industrial and Engineering Chemistry, Vol. 38, 1946, (pp. 980–985) TP1A58.

Underkofler, et al., Industrial Fermentations, Vol. I, Chem. Publ. Co., Inc., N.Y., 1954, (pp. 30–50) TP505u5.

Herstein et al., Chemistry and Technology of wines and Liquors, 2nd ed., D. Van Nostrand Co., Inc., New York, 1948 (pp. 75–78), TP505H48c.2.

*Primary Examiner*—David M. Naff
*Attorney, Agent, or Firm*—Kirkland and Ellis

[57] ABSTRACT

Distillers yeast is produced by a process which results in more rapid yeast growth, higher cell concentrations and greatly extended yeast viability. The process involves propagating yeast on a culture medium of cooked cereal grain mash which has been subjected to enzymatic action of glucamylase obtained from fungi of the genus Aspergillus. After propagation, as a result of substantially longer viability, the yeast can be stored in the culture medium for up to 3 days or longer with portions being withdrawn from time to time for inoculating distillery grain mashes.

6 Claims, 2 Drawing Figures

EFFECT OF YEAST GROWTH SUBSTRATES ON YEAST (No. 109) VIABILITY DURING STORAGE AT 60° F.

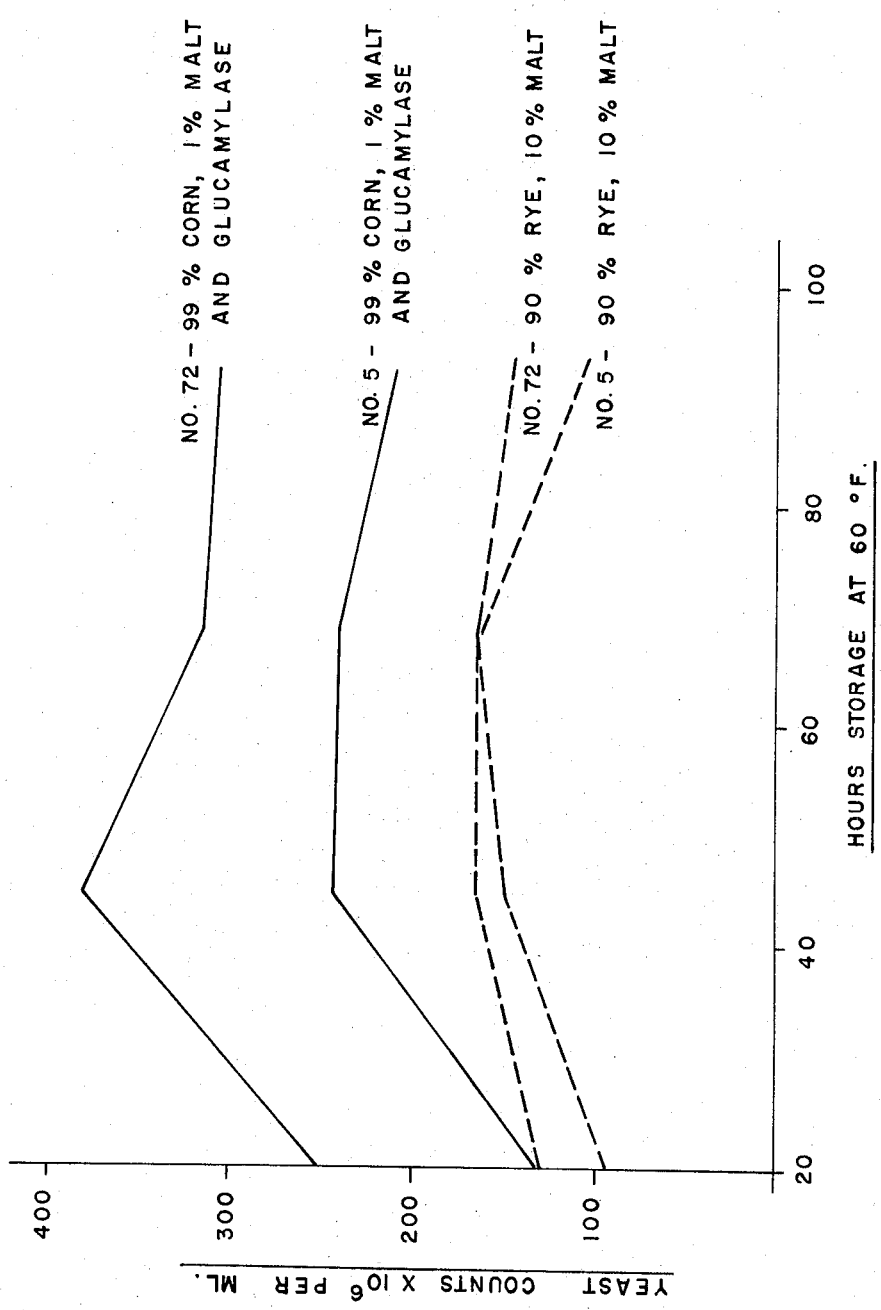

PRODUCTION OF DISTILLERS YEAST

CROSS-REFERENCE

This application is a continuation-in-part of applicants' copending U.S. patent application, Ser. No. 189,678, filed Oct. 15, 1971 now abandoned.

BACKGROUND OF THE INVENTION

1. Field of the Invention

This invention relates to a novel method for propagating yeast and, more particularly, to the propagation and storage of yeast used to inoculate distillery grain mashes in the production of whiskey and spirits from cereal grains and grain derivatives. By use of this method, a number of economic and operating advantages over the conventional methods of yeast propagation may be achieved.

2. Description of the Prior Art

The conventional methods of propagating yeast for grain distillery use are fully described in numerous books and periodicals. One such reference is "Industrial Fermentations," Chemical Publishing Co., New York, edited by L. A. Underkofler and R. J. Hickey. In Volume I, Chapter 2, by W. H. Stark, under "Plant Yeast Procedure" at page 45, the following statement is made: "The memdium (for yeast propagation) is mash prepared at a higher concentration medium than the fermentor mash. Common practice is to use 16 gallons of water per bushel of grain and (consequently) the yeast mash is relatively rich in nutrients as compared with a corn-spirits mash. At one time, either 100% barley malt mashes or 50% rye and 50% barley malt mashes were used. It has been found that a 70% corn to 30% barley malt mash provides sufficient nutrients. Lower levels of malt may be inadvisable depending upon other conditions." Thus, yeast mashes heretofore have contained appreciable amounts of barley malt (which is always more expensive than corn or milo) and rye (which is often more expensive than corn or milo).

Yeast mashes of ground rye and barley malt are generally heated in water slurry to gelatinize the starch and solubilize the other nutrients, such as the vitamins, minerals, and proteinaceous materials which are necessary for rapid yeast growth. After this mashing period, which permits these cereal enzymes to digest the grain starch and protein, the mash may either be immediately sterilized (sweet yeast mashing process) or the mash may be inoculated with lactic acid producing bacteria and incubated at 122°–130°F. to produce 0.5–1.5% lactic acid, then sterilized (sour yeast mashing process). After sterilization, the mash is cooled to the temperature desired for yeast growth, i.e., 75°–90°F., and the yeast is introduced and allowed to grow until about 40–50% of the available sugars have been utilized. The yeast is then cooled to 50°–60°F. and can then be used for inoculating fermentors or it can be stored for a period of time needed but not longer than 24 hours as yeast cells die quite rapidly when propagated and stored as described above (see FIG. 1).

While the conventional methods for propagating yeast for grain distilleries may vary in certain details from that outlined above, the procedure is basically the same from distillery to distillery. Rye, barley, and barley malt are the usual grains used because, under the mashing conditions employed, these grains provide adequate amounts of the nutrients required to propagate distillers yeasts. Without special treatment, such as described herein, corn and grain sorghum (milo) do not support either rapid yeast growth or rapid growth and acid production by the lactic acid organisms used to sour yeast mashes. Therefore, mashes comprising high percentages of corn and/or milo, as normally processed, cannot be used satisfactorily to propagate distillers yeast. Various additives to corn and milo mashes have been recommended to overcome these nutritional deficiencies, among them urea, inorganic nitrogen, protein concentrates, yeast cell preparations, vitamins, etc., but each of these adds to the cost of yeast propagation and often has undesirable physiological effects upon the yeast or flavor effects upon the alcoholic distillate being produced.

The prior art also reveals other yeast growth supplements that have been proposed for cultivating distillers yeast. One example is "mold bran" produced by cultivating certain species of Aspergillus on moistened, acidified bran (Underkofler, et al., Ind. & Eng. Chem. 38, 980–985, 1946). These investigators recommend a yeast mash of about 94% corn, 4% barley malt, and 1–2% mold bran along with inorganic nitrogen supplements, such as diammonium phosphate and ammonium sulfate. This method has the disadvantages of requiring special equipment for producing mold bran and, in addition, the use of at least 4% barley malt and nitrogen salts which add appreciably to the cost of yeast preparation.

Accordingly, it is a primary object of this invention to provide an improved method of propagating and maintaining distillers yeast.

An equally important object is to provide a method of propagating distillers yeast featuring rapid yeast growth, comparatively high viable cell counts, and exceptionally long yeast viability such that the yeast inoculum levels in alcoholic fermentation can be reduced by about one-half.

A further object is to provide a method of propagating distillers yeast on cereal grain substrates comprising at least about 95% corn and/or grain sorghum (milo) and only minor amounts (i.e., 2% or less) of malted grain.

A still further object is to provide a method of propagating distillers yeast that can be carried out with existing equipment and with existing facilities.

Yet another object is to provide an improved method of processing cereal grain to obtain whiskey and spirits.

SUMMARY OF THE INVENTION

The foregoing and other objects, advantages, and features of the subject invention may be attained by cultivating yeast for distillery grain fermentation on cereal grain mashes, especially those comprising at least about 95%, preferably at least about 99%, corn or milo, subjected to action of glucamylase ferments such as those described in U.S. Pat. No. 3,418,211. It has been discovered that these ferments, which are rich in enzymes, especially amylases, proteinases, phytase, etc., have an exceptional capacity to modify cereal grain mashes for the growth and viability of distillers yeast.

More particularly, in accordance with the method of this invention, a cooked mash of ground cereal grain, especially corn and/or grain sorghum (milo) is prepared. The starch content of the cooked mash is thus gelatinized and, if desired, a minor amount (i.e., no more than about 2% by weight) of salted cereal (e.g., barley malt) or microbial amylase may be added in order to thin and liquify the mash. Glucamylase ferment is added to the cooked cereal grain mash, acid producing bacteria or another source of acid may be added if desired, and the resulting mixture is incubated for about 4–6 hours and at a temperature of about 120°–140°F. in order to hydrolyze the starch and protein content of the mash. The treated mash is sterilized, cooled to about 80°F., inoculated with distillers yeast and incubated at a temperature of about 80°F. until the Balling drops about 4°–5°. The yeast culture is then cooled to about 60°F. and stored in its propagation medium for up to 3 days.

The propagation of distillers yeast in accordance with the foregoing method has a number of advantages, principal among which are:

1. more rapid yeast growth yielding larger numbers of active cells sooner;
2. more viability maintaining larger numbers of active cells longer;
3. less equipment, as inoculum size reduction permits more "sets" (i.e., inoculations) to be obtained from each propagation;
4. less raw materials, as fewer yeast tubs are required and rye and barley malt can be substantially eliminated;
5. less labor, as fewer yeast tubs need be prepared;
6. when propagated anaerobically, the yeast requires less time to acclimatize to the final grain fermentation substrate;
7. more adaptability to automatic control because the substrates need not be specially prepared; and
8. operating steps have been greatly simplified.

IN THE DRAWING

FIG. 1 is a plot yeast count versus time for the data produced in Example 1; and FIG. 2 is a plot yeast count versus time for the data produced in Example 9.

DESCRIPTION OF THE PREFERRED EMBODIMENTS

Figure 1:
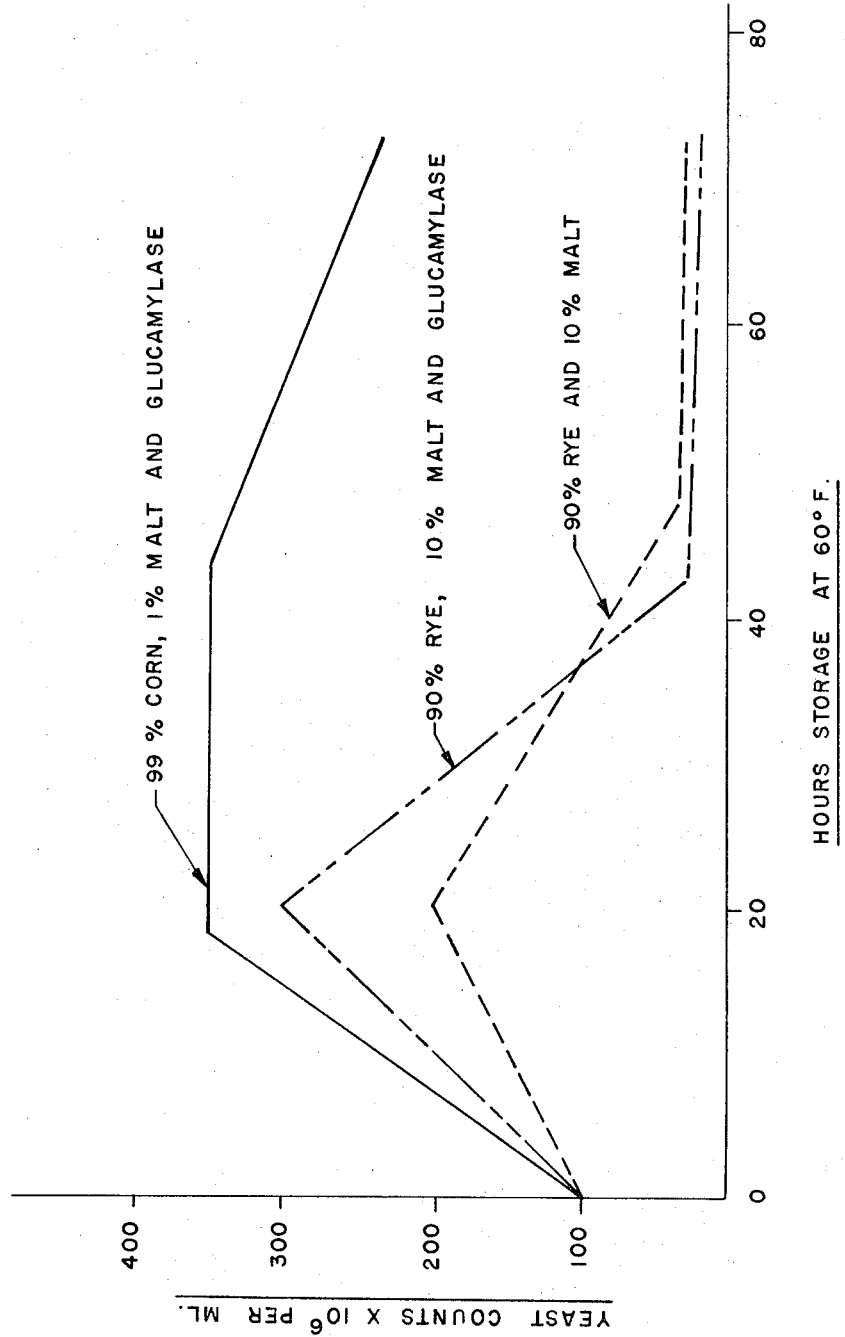

In accordance with this invention, the propagation and maintenance of distillers yeast can be enhanced by subjecting the cereal grain mashes, on which the yeast is cultivated, to a glucamylase ferment which converts the nutrients of the cereal grain mashes to an available form that can be metabolized by the yeast.

More particularly, the method involves the steps of preparing a cooked mash of ground cereal grains, especially mashes comprising at least about 95% corn and/or grain sorghum (milo). The mash is cooked until the starch content is gelatinized, and a minor amount (i.e., no more than about 2%, preferably no more than about 1%) of malted cereal (e.g., barley malt) or microbial amylase may be added in order to liquify and thin the cooked mash. The resulting mash is then treated with glucamylase ferment and, if desired, with lactic acid producing bacteria, and the resulting mixture is incubated for a time and at a temperature such that starch and protein of the mash are hydrolyzed (i.e., for about 4–6 hours at 120°–140°F.) The mash is then sterilized, cooled, inoculated with yeast, incubated and then cooled. The resulting incubated inoculum has higher than usual yeast cell counts and greatly extended cell viability such that the cells may be stored for 72 hours or longer before use.

As noted, a prime feature of this invention is the treatment of cereal grain substrates, especially corn and/or milo mashes, to the time and temperature controlled action of glucamylase ferments, such as those described in U.S. Pat. No. 3,418,211, dated Dec. 24, 1968. Such ferments, which are rich in enzymes, notably amylases, proteinases, phytase, etc., may, for example, be produced by cultivating selected strains of Aspergilli on cereal grain substrates, which normally contain 10–20% grain by weight, under submerged aerobic conditions with intensive aeration and agitation. The resulting ferment is called "glucamylase ferment" because it heretofore has been primarily used in the rapid and near-complete saccharification of grain starch to glucose in alcoholic fermentations.

It has now been discovered that this type of ferment, which can be produced using several different species and strains of Aspergilli, has an exceptional capacity to modify cereal grain mashes for the growth and viability of distillers yeast. Among the Aspergilli suitable for the method of this invention are *A. niger* NRRL 330; *A. foetidus* NRRL 337; *A. awamori* NRRL 3112 (also known as *A. niger* NRRL 3112); *A. niger* NRRL 3122; and *A. oryzae* NRRL 694, but the process of this invention is not limited to glucamylase ferments produced by these species or to the enzyme production methods described in U.S. Pat. No. 3,418,211. For example, enzyme products produced with selected cultures of Aspergilli by submerged aerobic cultivation such as those described by D. P. Langlois in U.S. Pat. No. 2,893,921, K. L. Smiley in U.S. Pat. No. 3,301,768, and H. E. Bode in U.S. Pat. No. 3,249,514 could also be used to obtain glucamylase ferments for use in this invention. Likewise, enzyme products produced by cultivating selected strains of Aspergilli on moistened or semi-solid substrates or on the unagitated surface of liquid substrates could be used. Glucamylase ferments produced with *A. awamori* NRRL 3112 are preferred.

Glucamylase ferments are important for the subject process of yeast propagation because they make available yeast nutrients from grains, especially corn and/or milo, thereby promoting yeast growth and viability. As a result, yeast cultures can be produced which possess exceptional numbers of active yeast and which maintain exceptional viability over long periods of time. Yet all of these features are attained more rapidly and at lower cost than by conventional methods.

Any of the several cereal grains such as wheat, corn, rye, barley, milo, and their derivatives may be used in the present method. Mixtures may also be employed. However, corn and/or milo are preferred by reason of their lower cost and by reason of the increased viability of yeast cells observed where corn and/or milo mashes are employed. Desirably, such mashes comprise at least about 95% corn and/or milo. It is especially preferred to use at least about 99% corn and/or milo mashes, with less than 1% by weight barley malt or the equivalent in bacterial enzymes in order to liquify and thin the cooked ground cereal grain mash prior to treatment with glucamylase ferment.

The cooked cereal grain mash is prepared in a conventional manner. For example, a corn and/or milo mash containing about 18 gallons of water per bushel of grain is cooked in water and/or stillage in order to gelatinize the starch. About 0.5% by weight barley malt is then added to liquify the mash. Alternatively, 200,000–400,000 D.V. units* of microbial amylase per bushel may be used in place of the barley malt. The resulting mash is then cooked for 30–60 minutes at 212°–250°F., preferably under pressure, in order to completely gelatinize the starches. The mixture is then cooled to about 140°–180°F. depending on the thinning agent used. Where microbial amylase is used, the temperature should be about 140°–180°F., whereas it should be about 140°–150°F., preferably about 146°–148°F., where barley malt is used. When cooling is completed, the mixture is thinned with 0.5% by weight barley malt or 200,000–400,000 D.V. units of microbial amylase per bushel.

*One D.V. unit dextrinizes 20 mg. Lintner Starch in 30 minutes at 30°C. and pH 6.6. See Premier Malt Products, Inc., Bulletin dated Sept. 1, 1964.

The resulting mash, which now contains about 1 bushel of grain per 25 gallons of volume is cooled to about 120°–140°F. and 1,000–20,000 units* (roughly about 0.5 to 1 pint) of glucamylase ferment are added per bushel of grain.

*A glucamylase unit is that amount of enzyme required to produce 1 gram of glucose from 4 grams of starch in 1 hour at 60°C.

If the preferred sour mashing process is desired, the mash is cooled to about 122°–130°F., preferably about 122°F. prior to glucamylase addition, and about 2–10% by volume lactic acid culture (e.g., *Lactobacillus delbrueckii*) is also added. Enzymatic action and lactic acid production are allowed to proceed concurrently, generally for at least about 4 hours, preferably about 4–6 hours, at a temperature in the range of about 122°–125°F., preferably about 122°F. This is generally sufficient to lower the pH to about 5.0 or below and to liberate nutrients from the grain starch, protein, and other grain constituents.

If further souring is desired, the incubation at about 122°F. can be continued; if souring is adequate and further hydrolysis is desired, the temperature can be raised to at least about 140°F.; if both are adequate and the mash is ready for inoculation with yeast, the temperature can be raised to around 160°F., which terminates both souring and glucamylase action. The mash can be held aseptically at this temperature for a week or more if desired.

Instead of using the lactic acid culture, an acidifying agent, such as stillage (the dealcoholized, liquid-grain residue from a previous grain alcohol fermentation) or sulfuric, hydrochloric, phosphoric, or lactic acid can be added prior to sterilization in order to reduce the mash pH to about 5.0 or lower as desired.

If a sweet yeast mashing process is desired, the cooked cereal grain mash can be treated with the glucamylase ferment in the range of about 120°–140°F.

In any event, prior to inoculation with yeast, the mash treated as described above is sterilized at about 190°F. or above for 2 hours or more, cooled to about 80°F. (the yeast propagation temperature) and set with 2–3% yeast culture by volume. To obtain the high yeast counts that characterize this invention, the set Balling* should range between 18° and 21°. As is known in the art, control of both the temperature and the Balling from this point on is essential to making high viability yeast. As soon as the Balling has dropped 4°–5° below set Balling, the mash must be cooled to 60°F. or below and held at this temperature. This yeast culture is then ready to be used for inoculating grain mashes or it may be stored at this temperature for up to 3 days or more before using. Normally, the yeast culture is stored in its propagation medium, with portions being withdrawn from time to time for use in inoculating grain mashes. Conveniently, the culture is maintained in the yeast tubs in which they are propagated.

*Balling is a measure of dissolved solids and is therefore a rough measure of sugar content.

As a result of the substantially longer viability of the yeast, it is ordinarily possible on a commercial basis to propagate only one or two batches of yeast per week, thereby greatly reducing yeast propagation costs.

EXAMPLE 1

The improved growth and viability of distillers yeast which is obtained by the use of the present method over one of the older conventional methods have been demonstrated as follows. Hiram Walker Distillers Yeast No. 109 was inoculated into three different substrates, viz.: (1) 90% rye and 10% barley malt, which is commonly used in distillery practice, (2) 90% rye, 10% barley malt plus glucamylase ferment at the rate of 1 pint per bushel of grain, and (3) 99% corn, 1% malt plus glucamylase ferment at the rate of about 1 pint per bushel of grain. These glucamylase ferments were produced with *A. awamori* NRRL 3112 in accordance with the method of U.S. Pat. No. 3,418,211. All mashes were soured with the same lactic acid culture and were then sterilized and cooled. Yeast culture was added and the mashes were incubated at the same temperature until the Balling was reduced 4°. The mashes were then placed at 60°F. and viable yeast numbers were measured during the next 3 days by the usual method of serial dilution and plating in a medium containing 1% yeast Extract (Difco), 1% glucose and 1.5% agar adjusted to pH 6.8. Yeast colonies were counted after 48 hours incubation at 90°F. The data are summarized in FIG. 1. It is apparent that the viable yeast count reached an appreciably higher figure in the 99% corn, 1% malt, glucamylase ferment mash than it did in either of the 90% rye, 10% malt mashes and these high viable counts persisted many hours longer. The glucamylase ferment improved the 90% rye, 10% malt mash insofar as viable yeast counts were concerned but did not improve the yeast viability.

EXAMPLE 2

This experiment demonstrates that the subject method of anaerobically propagating distillers yeast in corn mash treated with glucamylase ferment produced with *A. awamori* NRRL 3112 results in a higher viable yeast population than does the treatment of corn mash with other enzymes, viz, barley malt or a commercial, purified amylolytic enzyme, i.e., Diazyme which is a product of Miles Laboratories, Inc., Elkhart, Ind. Diazyme, however, does possess some of the same type of stimulating activity.

Normal distillery corn mash, cooked on a 1 hour cycle reaching a maximum of 250°F. and containing 1% barley malt for liquefaction of the mash, was divided into 3 portions of 500 ml each. The pH was adjusted to 5.0 with lactic acid and the mashes were sterilized at 250°F. The mashes were cooled to 90°F. and the following enzymic materials were added and allowed to act for 4 hours.

1. 4 ml (about 70 glucamylase units) of glucamylase ferment.
2. 120 units of glucamylase as Diazyme.
3. 20 g. barley malt (about 2,000 Dextrinizing Units*).

*A malt Dextrinizing Unit is that quantity of alpha amylase which will dextrinize soluble starch in the presence of an excess of beta amylase at the rate of 1 g/hr at 20°C.

The mashes were then cooled to 60°F., inoculated with 5% by volume of actively growing yeast and incubated at 60°F. for 18 hours. The viable yeast count was determined in each flask and the temperature was raised to 90°F. After 5 hours, viable yeast counts again were made and the flasks were cooled to 60°F. Thereafter, viable yeast counts were made at 24 hour intervals. Results are shown in the table below:

| Hours | VIABLE YEAST CELLS (millions/ml) | | |
|---|---|---|---|
| | (Flask 1) Glucamylase | (Flask 2) Diazyme | (Flask 3) Malt |
| 0 | 24 | 31 | 16 |
| 5 at 90°F. (cooled) | 83 | 56 | 61 |
| 24 at 60°F. | 162 | 120 | 129 |
| 48 at 60°F. | 270 | 250 | 160 |
| 72 at 60°F. | 370 | 210 | 150 |
| 96 at 60°F. | 320 | 160 | 60 |

The viable yeast counts in the malt-treated mash are normal for distillery mashes. Treatment with the commercial enzyme, Diazyme, resulted in increased counts and improved viability, while treatment with glucamylase ferment resulted in both exceptionally high viable yeast counts and exceptionally long viability.

EXAMPLE 3

This experiment compares some enzymes and nutrient additives for their effect upon yeast growth in corn mash. The corn mash was prepared as described under Example 2. The mashes were raised to 120°F. and 15 ml of actively growing lactic acid culture was added to each flask containing 500 ml of mash. The additives used are shown in the table below. All flasks were incubated to allow enzymic action for 5 hours at 120°F., then were sterilized at 250°F.

| Flask No. | Additive to 500 ml Corn Mash* |
|---|---|
| 1 | None |
| 2 | 10 g. glucose |
| 3 | Vitamin mixture containing biotin, thiamine, pantothenic acid and pyridoxin |
| 4 | 5 g. barley malt containing a total of 560 Dextrinizing Units of alpha amylase |
| 5 | 0.5 g. papain (commercial grade) |
| 6 | 40 units of glucamylase ferment (10 ml of *A. awamori* NRRL 3112 ferment) |

*The glucose and vitamins were added after sterilization; the enzymes were added before the 5 hour incubation at 120°F.

Distillers yeast inoculum was grown in corn mash identical to flask 1 for 72 hours at 60°F. This culture was then used at the rate of 10 ml per flask to inoculate flasks 1 through 6. Viable yeast numbers were determined in each flask after inoculation and 5 hours incubation at 90°F. Results were as follows:

| Flask No. | Viable Yeast Cells in Millions/ml | |
|---|---|---|
| | 0 Hours | 5 Hours |
| 1 | 20 | 32 |
| 2 | 22 | 36 |
| 3 | 24 | 30 |
| 4 | 25 | 40 |
| 5 | 20 | 44 |
| 6 | 23 | 50 |

It is apparent that the addition of vitamins and glucose had a low stimulatory effect on yeast growth in corn mash compared with the addition of these enzymes. Of the enzymes used, glucamylase ferment showed the highest stimulating effect on growth, although malt and papain showed some activity.

EXAMPLE 4

This experiment is an extension of Example 3 in that it compares the effects of enzymes, glucose, and vitamins on yeast growth and viability. Vitamins were included in this trial because they have long been known to increase the rate of growth of many microorganisms but have not been extensively studied for their effect on viability. The corn mash was prepared in a manner similar to Example 2 and was soured similarly with lactic acid organisms. The glucamylase ferment was prepared with *A. awamori* NRRL 3112. Below are the additives used:

| Flask No. | Additive to 500 ml Corn Mash |
|---|---|
| 1 | Vitamins (same as under Example 3) |
| 2 | 10 g. glucose (because this mash was semisolid due to its starch content, it was diluted with 1:1 water) |
| 3 | 5 g. barley malt containing a total of 560 Dextrinizing Units of amylase |
| 4 | 0.5 g. papain (commercial grade) |
| 5 | 40 units of glucamylase ferment (10 ml of ferment) |

All flasks were inoculated with distillers yeast and incubated overnight at 60°F. The flasks were then placed at 90°F. for 5 hours, then lowered to 60°F. Viable yeast counts were determined as shown below:

| Flask No. | Additive to 500 ml Corn Mash |
|---|---|
| 1 | Vitamins (same as under Example 3) |
| 2 | 10 g. glucose (because this mash was semisolid due to its starch content, it was diluted with 1:1 water) |
| 3 | 5 g. barley malt containing a total of 560 Dextrinizing Units of amylase |
| 4 | 0.5 g. papain (commercial grade) |
| 5 | 40 units of glucamylase ferment (10 ml of ferment) |

It is apparent from these results that glucose and vitamins have much less ability to promote the growth and maintain the viability of yeast in grain mashes than the enzyme additives. Of the enzymes used, glucamylase ferment was the most effective.

EXAMPLE 5

Previous experiments demonstrate the subject method of propagating yeast in corn mashes treated with certain enzymes. This experiment shows that yeast prepared by the subject method can be used at a lower than normal level to inoculate grain mashes to produce spirits or whiskey. A corn spirits mash was prepared by cooking the corn with 0.5% barley malt (added for liquefaction) on a 1 hour cycle reaching a maximum of 250°F. This mash was cooled to 148°F. and 0.5% barley malt was added for further liquefaction and the mash was held at 148°F. for 30 minutes. The mash was cooled to 90°F. Stillage was added at the rate of 25% of the final volume. Glucamylase ferment, produced with *A. awamori* NRRL 3112, was added at the rate of 1 pint per bushel and distillers yeast grown on corn mash treated with glucamylase ferment was added at the rate of 0.5% of the final volume. Another fermentor of the same corn spirits mash prepared in the same manner was inoculated with 1% by volume of yeast grown on a yeast mash of 90% rye and 10% barley malt. These fermentors were followed for their rates of fermentation and alcohol yields. Results are shown below:

|  | Medium for Yeast Propagation | |
|---|---|---|
|  | Corn-Glucamylase Ferment | Rye-Barley Malt |
| % Inoculum | 0.5 | 1.0 |
| Viable yeast in inoculum when used millions/ml | 115 | 100 |
| Rate of fermentation, weight loss in g. |  |  |
| 19 hours | 17.5 | 18.2 |
| 26 hours | 26.0 | 26.6 |
| 43 hours | 30.9 | 31.2 |
| 98 hours | 31.8 | 32.0 |
| Final ethyl alcohol content, % by weight | 6.31 | 6.26 |

These results show that the yeast grown on corn-glucamylase ferment used at the rate of 0.5% by volume fermented as rapidly and gave a yield of alcohol comparable to rye-malt yeast used at the rate of 1% by volume.

EXAMPLE 6

This experiment illustrates the subject process under commercial operating conditions. A standard yeast mash of 90% rye and 10% barley malt was prepared by mashing these grains at 146°F. for 30 minutes in a cooker, transferring to a yeast fermentor, cooling to 128°F., adding lactic culture and souring the mash at 120°–125°F. The mash was then pasteurized, cooled to 80°F., and inoculated with Hiram Walker Distillers Yeast 109. After a Balling drop of 4°, the temperature was reduced to 60°F.

A 99% corn, 1% barley malt, glucamylase ferment yeast mash was prepared by cooking the corn and malt on a one hour cycle reaching a maximum of 250°F., cooling to 122°F., adding by volume 3% lactic culture and 1.1% glucamylase ferment (prepared with *A. awamori* NRRL 3112) and incubating until the mash reached the same pH (3.8) as the rye-malt mash described above. The mash was then pasteurized, cooled to 80°F., inoculated with the same yeast strain and incubated until the Balling dropped 4° and then was cooled to 60°F. Both mashes had similar grain concentrations before inoculating with yeast, i.e., about one bushel of grain in 25 gallons. Samples of each mash were removed periodically for the determination of viable yeast numbers with the results shown below:

| Hours of Storage at 60°F. | Millions of Viable Yeast Cells/ml | |
|---|---|---|
|  | Rye-Barley Malt | Corn-Glucamylase Ferment |
| 0 | 111 | 40 |
| 24 | 199 | 290 |
| 48 | 48 | 366 |
| 70 | 27 | 270 |

It will be observed from these results that the corn-glucamylase ferment mash supports much higher viable yeast numbers with much more extended viability than does the rye-barley malt yeast mash.

EXAMPLE 7

This experiment illustrates that different species and strains of Aspergilli produce ferments which are suitable for the subject process. Ferments of *A. awamori* NRRL 3112, *A. niger* NRRL 330, and *A. foetidus* NRRL 337 were prepared according to the process of U.S. Pat. No. 3,418,211, and the resulting ferments were used to propagate yeast as described under Examples 2 and 3 above, with these modifications: One thousand ml of corn mash was prepared for each using: (1) no glucamylase ferment, (2) 80 glucamylase units of ferment produced with *A. awamori* NRRL 3112, (3) the same amount of ferment used in (2) except that the enzymes were inactivated by heat before addition, (4) about 80 glucamylase units produced with *A. niger* NRRL 330, and (5) about 65 glucamylase units produced with *A. foetidus* NRRL 337.

The mashes were cooled to 60°F. and inoculated with 2% actively growing yeast by volume and incubated at 60°F. for 18 hours. Viable yeast counts were determined in all flasks and the temperature was raised to 90°F. After 5 hours, viable yeast counts again were made and the flasks were cooled to 60°F. Thereafter, viable counts were made at regular intervals. Results are shown below:

| Number | 1 | 2 | 3 | 4 | 5 |
|---|---|---|---|---|---|
| Glucamylase Ferment Source | None | *A. awamori* (Active) | *A. awamori* (Inactive) | *A. niger* | *A. foetidus* |
|  | Millions of Viable Yeast Cells/ml | | | | |
| 0 Hours | 5 | 7 | 5 | 5 | 7 |
| 5 Hours 90°F. (cooled) | 43 | 47 | 47 | 30 | 98 |
| 24 Hours 60°F. | 118 | 245 | 126 | 237 | 249 |
| 48 Hours 60°F. | 128 | 346 | 202 | 315 | 353 |
| 72 Hours 60°F. | 260 | 440 | 300 | 370 | 440 |

It is apparent that ferments produced by different species and strains of Aspergilli are capable of stimulating yeast growth and improving yeast viability. The heat-inactivated ferment contained much less of this activity indicating that the active substances are enzymatic in nature.

A number of experiments have been performed to determine if distillers yeasts, in general, are improved in growth rate, maximum viable numbers per unit volume and in extended viability when cultivated in grain mashes treated according to the process of this invention. The foregoing examples all used Hiram Walker Distillers Yeast No. 109. However, it has been found in a number of other experiments that other yeasts respond in a similar manner.

EXAMPLE 8

For example, in one such experiment with Hiram Walker Distillers Yeast No. 3, a maximum viable yeast cell count of 490 million per ml was obtained in 48 hours and after 72 hours the viable cell count was still 300 million per ml in a corn mash medium treated with glucamylase ferment. Rye-barley malt mashes inoculated with this yeast strain and otherwise handled according to the previous examples give maximum viable cell counts of about 150 to 200 million per ml which decrease rapidly to about 50 million viable cells per ml in 72 hours.

EXAMPLE 9

In order to demonstrate that other distillers yeasts show similar growth and viability responses when cultivated by the subject process, the following experiment was performed with two additional distillers yeast strains, viz, Hiram Walker Distillers Yeast No. 5 and Hiram Walker Distillers Yeast No. 72. Two 10-liter portions of corn mash were treated with glucamylase ferment and were simultaneously soured with lactic acid organisms. These mashes were pasteurized, cooled to 60°F. and one mash was inoculated with 400 ml of an actively growing culture of Yeast No. 5 and the other with the same volume of an actively growing culture of Yeast No. 72. The inoculated mashes were held at 60°F. overnight, then were raised to 90°F. and incubation was continued at 90°F. until a Balling drop of 4° to 5° was attained. These same yeast strains also were used to inoculate each of two 10-liter volumes of commercial rye-barley malt mash which had been cooked, soured, pasteurized, then incubated first at 70°F. and then at 90°F. until a similar Balling drop was attained. Thereafter, all four yeast mashes, two of each type, were cooled to 60°F. and held for 4 days. Viable yeast counts were determined at 24 hour intervals. Results are shown in the table below and in FIG. 2.

| Hrs. of Storage at 60°F | Viable Yeast Cells in Millions/ml | | | |
|---|---|---|---|---|
| | Yeast No. 5 | | Yeast No. 72 | |
| | Rye-Barley Malt | Corn-Glucamylase | Rye-Barley Malt | Corn-Glucamylase |
| 20 | 98 | 135 | 129 | 257 |
| 44 | 144 | 246 | 162 | 382 |
| 68 | 161 | 242 | 161 | 315 |
| 92 | 106 | 211 | 141 | 307 |

It will be seen from the data in the table and in FIG. 2 that these additional distillers yeast strains developed higher yeast cell counts with substantially longer viability when grown on corn mash treated with glucamylase than when grown on rye-barley malt mash.

We claim:

1. A method of propagating distillers yeast comprising the steps of:

preparing a cooked mash of ground cereal grain in water with the cereal grain comprising at least 95% by weight of a member selected from the group consisting of corn, milo, and mixtures thereof;

adding to the mash glucamylase ferment produced by the submerged, aerobic fermentation of a cereal grain mash with a glucamylase producing mold strain selected from the group consisting of A. niger; A. foetidus; A. awamori; and A. oryzae with about 1,000–20,000 units of glucamylase ferment per bushel of grain being used to treat the cereal grain mash;

incubating the resulting mixture of mash and glucamylase ferment at a temperature of about 120°–140°F. for about 4–6 hours;

sterilizing the mash;

cooling the resulting sterilized mash to about 80°F.;

inoculating the resulting cooled sterilized mash with distillers yeast;

incubating the inoculated mash until the Balling of the mash has dropped about 4°–5°;

cooling the resulting yeast culture to a temperature of no more than about 60°F;

maintaining the yeast culture in the mash in which it was propagated at a temperature of no more than about 60°F.; and storing the yeast at said temperature of no more than about 60°F. in the mash in which it was propagated for at least about 72 hours and during storage withdrawing portions of yeast periodically to inoculate distillery grain mashes for alcohol production.

2. A method, as claimed in claim 1, wherein the cereal grain further comprises an enzymatic material selected from the group consisting of malted cereal grain and microbial amylase in an amount sufficient to liquify and thin the mash.

3. A method, as claimed in claim 1, wherein the pH of the mash is adjusted to a level no higher than about 5.0 prior to sterilization.

4. A method, as claimed in claim 3, wherein the pH is adjusted by inoculating the mash with lactic acid producing bacteria, with the mash to which the glucamylase ferment and the bacteria have been added being incubated for at least about 4–6 hours at a temperature of about 122°–125°F.

5. A method, as claimed in claim 3, wherein the pH is adjusted by adding to the mash a member selected from the group consisting of stillage, sulfuric acid, hydrochloric acid, lactic acid, and phosphoric acid or mixtures thereof.

6. In the process for producing whiskey and spirits, the improvement comprising inoculating the cereal grain mash with about 0.5–2.0% by volume of a yeast culture produced in accordance with the method of claim 1.

\* \* \* \* \*